Feb. 5, 1929.
J. DELLINGER
1,700,823
HAT AND GARMENT HOLDER
Filed Sept. 3, 1926
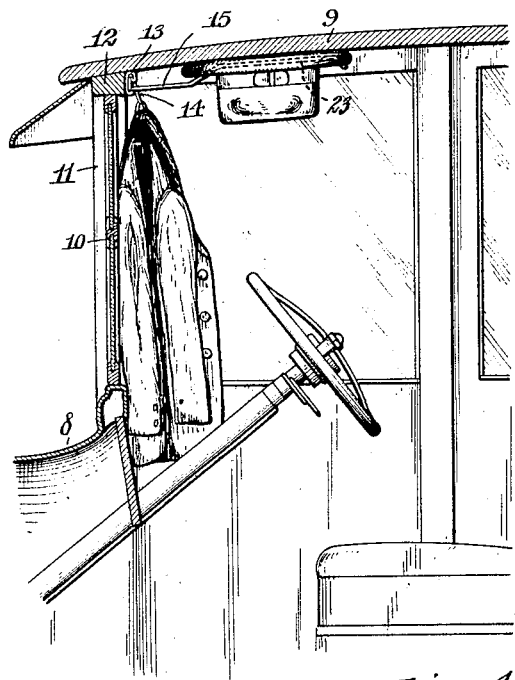
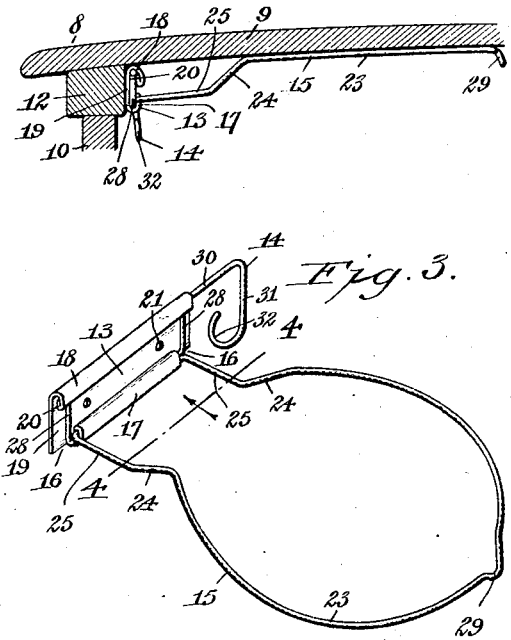
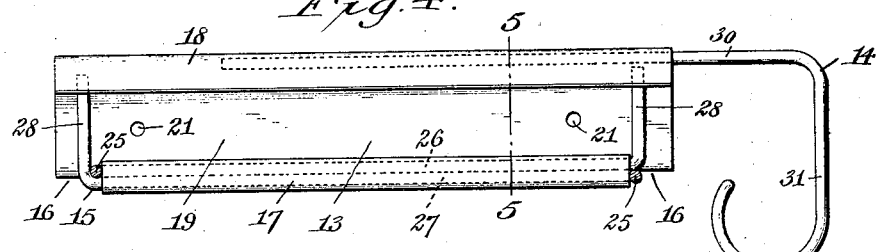
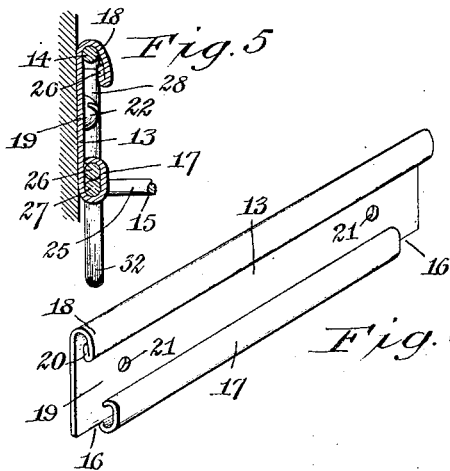
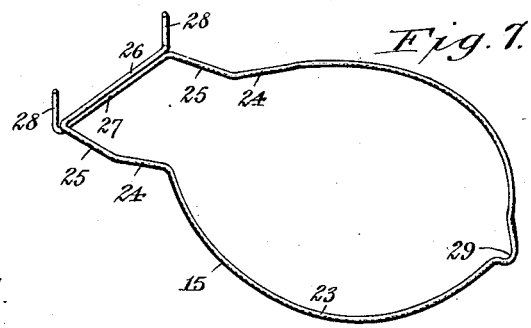
John Dellinger, Inventor.
Witness.
J. J. Oberst.

Patented Feb. 5, 1929.

1,700,823

UNITED STATES PATENT OFFICE.

JOHN DELLINGER, OF BUFFALO, NEW YORK.

HAT AND GARMENT HOLDER.

Application filed September 3, 1926. Serial No. 133,501.

This invention relates to hat and garment holders, and more particularly to a holder adapted for use in automobiles, especially enclosed automobiles.

One of the objects of my invention is the production of a hat holder which is so constructed that a hat having an upturned rim can be conveniently held in contact with the roof of an automobile without having any portion of the holder come in contact with the upturned portion of the hat rim.

Another object of my invention is to provide a simple holder of this kind in which a hat-holding element and garment-hanger are applied to a single support, by means of which the entire device is fastened in place.

Another object of my invention is to provide a device of this kind in which the garment-hanger is adjustably arranged and also removably applied and adapted to be positioned at either end of the support or securing member of the device.

A further object of my invention is, to provide a device of this kind which will effectively retain a hat, regardless of the shape of its rim against the roof of an automobile, or any other object to which the device may be secured, and to so construct the same that a hat can be conveniently placed therein and as readily removed therefrom.

A still further object is, to provide a hat holder combined with a garment-hanger or hook so constructed that each can be independently manipulated, both being so arranged that they co-operate in that they have common retaining means; and also to provide a device which is simple in construction, easily manufactured, and inexpensive to produce.

With the above and other objects to appear hereinafter, the invention consists in the novel features of construction and in the arrangement and combination of parts to be hereinafter described and more particularly pointed out in the subjoined claims.

In the accompanying drawings:—

Fig. 1 is a vertical section through a portion of an automobile showing my improved hat and garment holder applied thereto, and illustrating the manner of holding a hat and hanging a garment thereon.

Fig. 2 is a somewhat enlarged longitudinal section through the roof of an automobile and a portion of the windshield frame, illustrating my improved hat and garment holder in side elevation and the manner of securing the same to the front cross-piece or header of the windshield frame.

Fig. 3 is a detached perspective view of the device.

Fig. 4 is an enlarged cross section taken on line 4—4, Fig. 3, looking in the direction of the arrow crossing said line.

Fig. 5 is an enlarged vertical section taken on line 5—5, Fig. 4.

Fig. 6 is a detached perspective view of the support to which the wire parts of the device are applied.

Fig. 7 is a detached perspective view of the hat-holding element.

The reference numeral 8 designates an automobile, 9 the roof thereof, 10 the windshield, and 11 the windshield frame which includes a header 12 at the upper end of the windshield. Said header is fastened to the under side of the roof 9 and has my improved hat and garment holder secured thereto so that the operator of the machine may place his hat within the holder while driving along and may also hang a coat or other garment on the device so that it will be in plain view and be readily accessible. It is, however, apparent that the device may be secured to other suitable parts of an automobile.

This improved hat and garment holder comprises a support or fastening element 13, a garment-hanging element 14, and a hat-holding element 15.

The fastening element is constructed of a strip of sheet metal cut away at opposite ends along one of its longitudinal marginal portions, as at 16, so that the strip is reduced in length between these cut away portions. The marginal portions of this strip extending along the full length of its longitudinally-reduced portion is bent upon itself to form a tube 17 in which portions of the hat-holding element 15 are retained, as will be more fully described hereinafter. Along the opposite edge of the support, the metal forming the same is recurved, as at 18, and held in spaced relation to the flat portion 19 of said support from which it is recurved, the marginal portion of this recurved portion being bent upon itself, as at 20.

The flat portion 19 of said support is provided with screw holes 21 through which screws 22 may be passed and threaded into any suitable portion of the automobile or to any other object to which it may be desired to attach the device. Preferably these screws are threaded into the header 12 at the upper end of the windshield within convenient reach of the operator of the automobile.

The hat-holding element 15 is formed of resilient wire curved centrally between its ends into open loop formation, as at 23, the loop thus formed being open at the rear or where it closest approaches the support 13. From this loop the wire is extended rearwardly and downwardly, as at 24, and thence rearwardly, as at 25, substantially parallel with the plane of the loop 23, the two portions 24 and 25 forming angular connecting arms, at the rear ends of which the wire is bent laterally in opposite directions to form straight-lined cross arms 26, 27, respectively. These cross arms lie along and in contact with each other, preferably one above the other, and have upstanding terminals 28 at their free ends. The cross arms 26 and 27 are placed within the tubular portion 17 at the lower edge of the support 13, either by inserting them thereinto from opposite ends before bending up the terminals 28, or after the hat-holding element is completely formed, in which event the cross arms are placed against the support within the tubular portion when partly closed, the tubular portion being fully closed and pressed in contact with these cross arms, after placement thereof, so that they are maintained in proper position and held against positioned movement therein. In any event, the upstanding terminals 28 are placed underneath the recurved portion 18 at the upper edge of the support 13, being clamped in position by firmly pressing said recurved portion so that the rebent marginal portion 20 is in firm contact with the ends of said terminals, as clearly shown in Fig 5. The recurved portion 18 and the rebent portion 20 therefore form a retainer flange, while the tubular portion 17 serves as an embracing or retainer tube, each cooperating with different portions of the wire forming the hat-holding element. The hat-holding element so fastened extends forwardly from the support and the securing of the cross arms 26 and 27 and the upstanding terminals 28 to the support 13 render the loop portion 23 and the arms connecting the same with the cross arms 26 and 27, flexible in nature, so that the loop portion 23 will be held in contact with the roof of the automobile or a surface of any object to which the device may be attached. The flexibility of this loop portion, and its rearwardly projecting arms permit it to be depressed or drawn downwardly so that a hat can be easily inserted between the same and the roof of the automobile with the crown of the hat extending through the loop, as shown in Fig. 1, and the rim bearing against the under side of the roof, where it is so maintained by the wire forming the loop, which wire lies in contact with the upper side of the rim of the hat, or as it may be termed, the under side of the rim when the hat is inverted, and held by said loop portion against the roof of the automobile. The upturned marginal portion of the rim of the hat is in no manner brought in contact with the device, due to the downwardly and rearwardly inclined portions 24 of the connecting arms at the rear end of said loop portion.

By directing the front portions of the connecting arms downwardly and rearwardly, the rear portions 25 thereof are in a lower plane than the loop portion 23 so that it provides proper clearance underneath the roof of the automobile for the upturned portion of the rim of the hat without coming in contact therewith. It will be apparent that a flat-rimmed hat can be held in position, as well as a hat having an upturned rim, and when a hat with an upturned rim is placed within the hat-holding element, the rim is maintained in its natural position without crushing or otherwise deforming the same.

It will be clear that the upturned terminals 28, by reason of the free ends thereof being held firmly against the support in spaced relation to the cross arms 26, 27 will convert said cross arms into tortional spring members, and when the loop portion 23 is drawn downwardly away from the roof of the automobile, the tendency of these cross arms is to rotate within the retainer tube 17 in which they are confined. For this reason the retainer tube has its wall more or less loosely encircling the two straight-lined tortional spring-portions or arms 26, 27 to permit of this, and while the disposition of the connecting arms with respect to the cross arms 26, 27 provide a certain degree of resiliency for the loop, the tortional or rotational action of the cross arms 26 without positional displacement assure greater flexibility for the loop portion 23 and a quicker recovery to return the same against the roof of the automobile when downward pressure is relieved therefrom. The inherent resiliency of the wire at its point of attachmnt to the support, as well as at other points, assures a free yielding structure with the needed qualities to properly hold a hat.

To enable the loop portion to be easily drawn downwardly, the outer end thereof is bent into V-formation, as at 29, and this V-formed portion is bent downwardly, as clearly shown in Fig. 2, thus providing a finger hold at the front end of the loop portion 23 for conveniently drawing the latter downwardly and permit the free insertion of the crown of a hat into said loop portion 23. When the hat is thus positioned and the loop portion is released, the wire forming said loop portion bears against the rim of the hat with the upturned marginal portion of the rim positioned outside of the wire and that portion of the upturned rim of the hat at the rear thereof is positioned between the roof of the automobile and the connecting arms without coming in contact with any part of the wire.

The garment-hanging element 14 is also formed of wire bent between its ends to form two arms 30, 31, the latter being comparatively short and having its terminal curved upon itself, as at 32, to form a hook. The longer arm 31 is placed underneath the recurved marginal portion 18 of the support 13, it being inserted into the space between the flat portion of said support and the recurved portion from either end of said support and being slidable therein so that the hook 32 can be positioned any desired distance from either end of the support, depending upon the end from which the garment-hanging element is inserted. The long arm 30 of this garment-hanging element is rotatable within the support so that the hook can be moved away from a wall to more readily hang a garment onto the hook, and the weight of the garment hanging thereon will cause the hook to be automatically returned to normal position or to a position approaching normal, depending on the portion of the garment lying against the windshield or other wall to which the device may be secured.

The rebent portion 18 extending along the upper edge of the support 13 and the ends of the upstanding arms 28 serving as the terminals of the wire forming the hat-holding loop 23 provide a proper guide for the long arm 30 of the garment-holding device.

The device comprises comparatively few parts and these parts are so formed that they can be easily nickeled or otherwise given a polished finish and if desired may be otherwise embellished.

Having thus described my invention, what I claim is:—

1. A device of the kind described, comprising a support formed of sheet metal bent along one of its longitudinal marginal portions into tubular formation and having a recurved portion along its other marginal portion, a hat-holding element formed of wire bent into loop formation and at the rear end of said loop being bent transversely in opposite directions to provide cross arms lying alongside each other within the tubular portion of said support, said wire having right-angled terminals at the free ends of said cross arms and having the ends of said terminals retained underneath the recurved portion of said support.

2. A device of the kind described, comprising a support formed of sheet metal bent along one of its longitudinal marginal portions into tubular formation, a hat-holding element formed of wire and having cross arms lying in contact with each other at its rear end and positioned within said tubular portion, the free ends of said cross arms being bent angularly and lying in contact with said support, and means on said support engaging said angularly bent ends and retaining the same against movement.

3. A device of the kind described, comprising a support having a tubular portion thereon, a hat-holding device formed of wire bent into loop shape to receive the crown of a hat and having at its rear end two cross arms arranged one above the other within said tubular portion and an angular terminal at the free end of each cross arm, extending outwardly from said tubular portion, and means on said support spaced from said tubular portion engaging the ends of said terminals and retaining them against movement.

4. A device of the kind described, comprising a support having one of its marginal portions fashioned into tubular formation and its opposite marginal portion recurved upon itself, a hat-holding element formed of wire bent between its ends into loop formation and having two oppositely-disposed cross arms arranged in contact one above the other and disposed within said tubular portion, the free end of each cross arm having an upstanding terminal and the ends of these terminals being clamped underneath the recurved portion of said support.

5. A device of the kind described, comprising a support formed of sheet material notched at one of its edges at opposite ends thereof and having the material between said notched portions fashioned into tubular formation, a hat-holding element formed of wire bent into loop formation between its ends and having spaced parallel rearwardly-extending arms at its rear end, said wire being bent laterally in opposite directions from the rear ends of said rearwardly-extending arms and disposed one above the other within said tubular portion and having upstanding terminals at the free ends of said transversely bent portions in the plane of said notches, and means on said support for clamping the upper ends of said terminals against movement.

6. A device of the kind described, comprising a support formed of sheet metal fashioned along its lower marginal portion into a tube and being recurved along its upper portion and rebent at its recurved edge, and a hat-holding element formed of wire bent between its ends into loop formation and having at the rear end of the loop so formed parallel rearwardly-extending arms inclined downwardly from the loop and thence directed rearwardly substantially parallel with said loop, said wire being oppositely directed at the rear ends of said arms and lying one above the other within the tube of said support, the free ends of said oppositely-directed wire portions extending from opposite ends of said tube and being bent upwardly and held at their terminals underneath the recurved and rebent portion at the upper end of said support.

In testimony whereof I affix my signature.

JOHN DELLINGER.